US012316058B1

(12) United States Patent
Xie et al.

(10) Patent No.: US 12,316,058 B1
(45) Date of Patent: May 27, 2025

(54) RETRACTABLE SLIP RING TRANSMISSION MECHANISM

(71) Applicant: ORIGIN Innovation Development Co., Ltd, Guangdong (CN)

(72) Inventors: Liqing Xie, Guangdong (CN); Biyuan Chen, Sichuan (CN)

(73) Assignee: ORIGIN Innovation Development Co., Ltd, Shenzhen (CN)

( * ) Notice: Subject to any disclaimer, the term of this patent is extended or adjusted under 35 U.S.C. 154(b) by 0 days.

(21) Appl. No.: 18/889,313

(22) Filed: Sep. 18, 2024

(30) Foreign Application Priority Data

Apr. 15, 2024 (CN) ........................ 202410449614.1

(51) Int. Cl.
*H01R 39/08* (2006.01)

(52) U.S. Cl.
CPC .................................... *H01R 39/08* (2013.01)

(58) Field of Classification Search
CPC ........ H01R 39/08; H02G 11/02; H02G 11/00; H02G 11/003; H02G 11/006; B65H 2701/34; B65H 75/4449; B65H 75/4434; B65H 75/40; B65H 75/44693; B65H 75/4471; B65H 75/4463
USPC .......................................................... 310/232
See application file for complete search history.

(56) References Cited

U.S. PATENT DOCUMENTS

| | | | | |
|---|---|---|---|---|
| 3,657,491 A * | 4/1972 | Ryder | B65H 75/4434 | 242/378 |
| 4,487,218 A * | 12/1984 | Sifri | B65H 75/38 | 242/379.2 |
| 2002/0111056 A1* | 8/2002 | Kawamura | B60R 16/027 | 439/164 |
| 2004/0200919 A1* | 10/2004 | Burke | H02G 11/02 | 242/378.1 |
| 2017/0215293 A1* | 7/2017 | Merenda | B60R 11/02 | |

* cited by examiner

*Primary Examiner* — Alexander A Singh

(57) ABSTRACT

A retractable slip ring transmission mechanism is disclosed, including a housing, a connecting wire, a telescopic component, and a transmitting component. The connecting wire is wrapped around the telescopic component, and the telescopic component is rotatably provided in the housing. The telescopic component includes a first fixed part, an elastic part and a second fixed part. The second fixed part is provided with a holding compartment on one side for placing the elastic part, and the holding compartment is provided with an opening. One end of the elastic part is provided on the outside of the holding compartment, and the other end of the elastic part is coiled within the holding compartment through the opening. Through improvement of the transmitting component, the structure is optimized, which not only can reduce the production process and lower the production cost, but also can increase the power transmission of the product.

6 Claims, 6 Drawing Sheets

RETRACTABLE SLIP RING TRANSMISSION MECHANISM

CROSS REFERENCE TO RELATED APPLICATION

This application claims priority to Chinese Patent Application No. CN202410449614.1, filed on Apr. 15, 2024, which is hereby incorporated by reference in its entirety.

TECHNICAL FIELD

The present application relates to the technical field of transmission mechanisms, and specifically to a retractable slip ring transmission mechanism.

BACKGROUND

Charging cables in existing 3C (i.e., Computer, Communication, and Consumer Electronics) charging filed, such as charging cables of cell phones, computers, tablets and other devices are wires external, which need to be rolled up when stored and the opened when used, resulted in extremely inconvenient. This problem may be solved through a retractable transmission mechanism, however the existing transmission mechanism is relatively larger and cannot be self-locked, and most of them are for a single sliding electricity transmission, thus there will have power outages and insufficient tensile feel during use.

Therefore, the present disclosure proposes a novelty retractable slip ring transmission mechanism to solve the above problems.

SUMMARY

The present disclosure aims to provide a novelty retractable slip ring transmission mechanism to address the problems discussed in the background.

To achieve above objectives, the present disclosure adopts the following technical solutions.

In some embodiments of the present disclosure, a retractable slip ring transmission mechanism is provided, including a housing, a connecting wire, a telescopic component, and a transmitting component. Herein the connecting wire is wrapped around the telescopic component, and the telescopic component is rotatably provided in the housing.

Herein the housing includes a front housing and a rear housing, the front housing is connected to the rear housing, and the front housing is provided with an axle centre.

Herein the telescopic component includes a first fixed part, an elastic part and a second fixed part. The first fixed part and the second fixed part are provided with mounting holes corresponding to the axle centre, the second fixed part is provided with a holding compartment on one side for placing the elastic part, the first fixed part and the second fixed part are pivotably socketed on the axle centre through the mounting holes, and the first fixed part is connected to the holding compartment.

Herein the holding compartment is provided with an opening, one end of the elastic part is provided on outside of the holding compartment and the other end of the elastic part is coiled in the holding compartment through the opening, and the one end of the elastic part is connected to the second fixed part.

Herein the axle centre is provided with a slot for snapping to the elastic part, the elastic part is provided with a card corresponding to the slot, and the slot on the axle centre is snapped to the card of the elastic part.

Preferably, the retractable slip ring transmission mechanism further includes a self-locking locator provided on the rear housing, the second fixed part is provided with a self-locking locating track at another side, and the self-locking locator is configured for positioning the self-locking locating track to rotation.

Preferably, the self-locking locating track includes outer rings, middle rings, an inner ring, and locating blocks, and the outer rings are connected to the middle rings.

When pulling of the connecting wire, the self-locking locating track rotates, and the self-locking locator slides from the inner ring of the self-locking locating track to the outer rings and slides between the outer rings and the middle rings.

When stop pulling of the connecting wire, under an action of the elastic part, the self-locking locating track rotates in an opposite direction and the self-locking locator is seated within the locating blocks of the self-locking locating track.

When slightly pulling of the connecting wire again, the self-locking locator slides from the locating blocks of the self-locking locating track to the inner ring and slides in the inner ring.

Preferably, the another side of the second fixed part is further provided with side tracks corresponding to the outer rings, middle tracks corresponding to the middle rings, sliding tracks corresponding to the locating blocks, and an inner track. The side tracks are connected to the middle tracks, the outer rings are disposed between the side tracks and the sliding tracks, the middle rings are disposed between the middle tracks and the sliding tracks, the inner ring is disposed between the sliding tracks and the inner track, the locating blocks are disposed between the side tracks and the inner track and also arranged between the sliding tracks.

Herein the side tracks are provided with first gliding arcs corresponding to the locating blocks, the side tracks are connected with the middle tracks through the first sliding arcs, the inner track is provided with second gliding arcs corresponding to the first gliding arcs, and the first gliding arcs and the second gliding arcs are disposed at each end of the locating blocks.

Herein each of the locating blocks is provided with a third gliding arc and a fourth gliding arc, and a locating bayonet is provided between the third gliding arc and the fourth gliding arc, and the locating bayonet is an arc with upper and lower crossing that being configured to snap with the self-locking locator.

Herein the sliding tracks are provided with bevels on both sides, one side of the sliding tracks corresponds to the locating bayonet, and another side of the sliding tracks corresponds to the third arc.

Preferably, the self-locking locator is provided with a locating pin being an inverted triangle piece enclosed by a rounded edge, and the locating pin is slidably provided in the self-locking locating track to snap-fit with the locating bayonet.

Preferably, the transmitting component includes a movable plate and a fixed plate, the movable plate is connected to the second fixed part, the fixed plate is connected to the rear housing, and the movable plate is rotatable abutted with the fixed plate.

Preferably, the movable plate includes a plurality of connectors, a connecting plate and a welding disk; each of the connectors is distributed in parallel with each other on the connecting plate, and each of the connectors is rotatable abutted with the fixed plate.

Herein the welding disk is connected in series with the connectors, and one end of the connecting wire is connected to the welding disk.

Preferably, the connectors include an insulating material and a plurality of conductive contacts. The insulating material is connected to the connecting plate, the conductive contacts are connected to the insulating material and rotatable abutted with the fixed plate.

Herein the conductive contacts include at least one positive contact, at least one negative contact, and at least one signal transmission contact. All positive contacts of the conductive contacts are connected in parallel with each other, all negative contacts of the conductive contacts are connected in parallel with each other, and all signal transmission contacts of the conductive contacts are connected in parallel with each other.

Preferably, the positive contact, the negative contact and the signal transmission contact are made of metal sheets, the signal transmission contact includes a first portion and a second portion, and the first portion has a width wider than that of the second portion.

Herein the fixed plate is provided with a plurality of inputs for connection to an external power supply and a conductive plate for connection to the connectors, the conductive plate is provided with a plurality of looped conductive tracks, and the positive contact, the negative contact and the signal transmission contact are rotatable connected with the looped conductive tracks.

Compared to the existing technologies, the retractable slip ring transmission mechanism of the present disclosure has at least the following beneficial effects and advantages. Through the improvement of the transmitting component, the structure is optimized, which not only can reduce the production process and lower the production cost, but also can increase the power transmission of the product. And meanwhile, the movable plate uses multiple connectors, so that the connectors and the fixed plate are in full contact with each other, thereby improving the stability of the transmission and the durability of the product. Moreover, by increasing the number of the locating rings, shorting the locating distance, and improving the self-locking locator and the self-locking locating track to better match, thereby pulling the wire and returning the wire have a better feel.

BRIEF DESCRIPTION OF THE DRAWINGS

To more clearly illustrate the technical solutions in the embodiments of the present disclosure and the prior art, the accompanying drawings to be used in the description of the embodiments or the prior art will be briefly introduced below. And it will be obvious that the accompanying drawings in the following description are only some of the embodiments of the present disclosure, and that for one person of ordinary skill in the art, other accompanying drawings may be obtained on the basis of the accompanying drawings without creative labor.

DETAILED DESCRIPTION OF THE EMBODIMENTS

Figure 1:
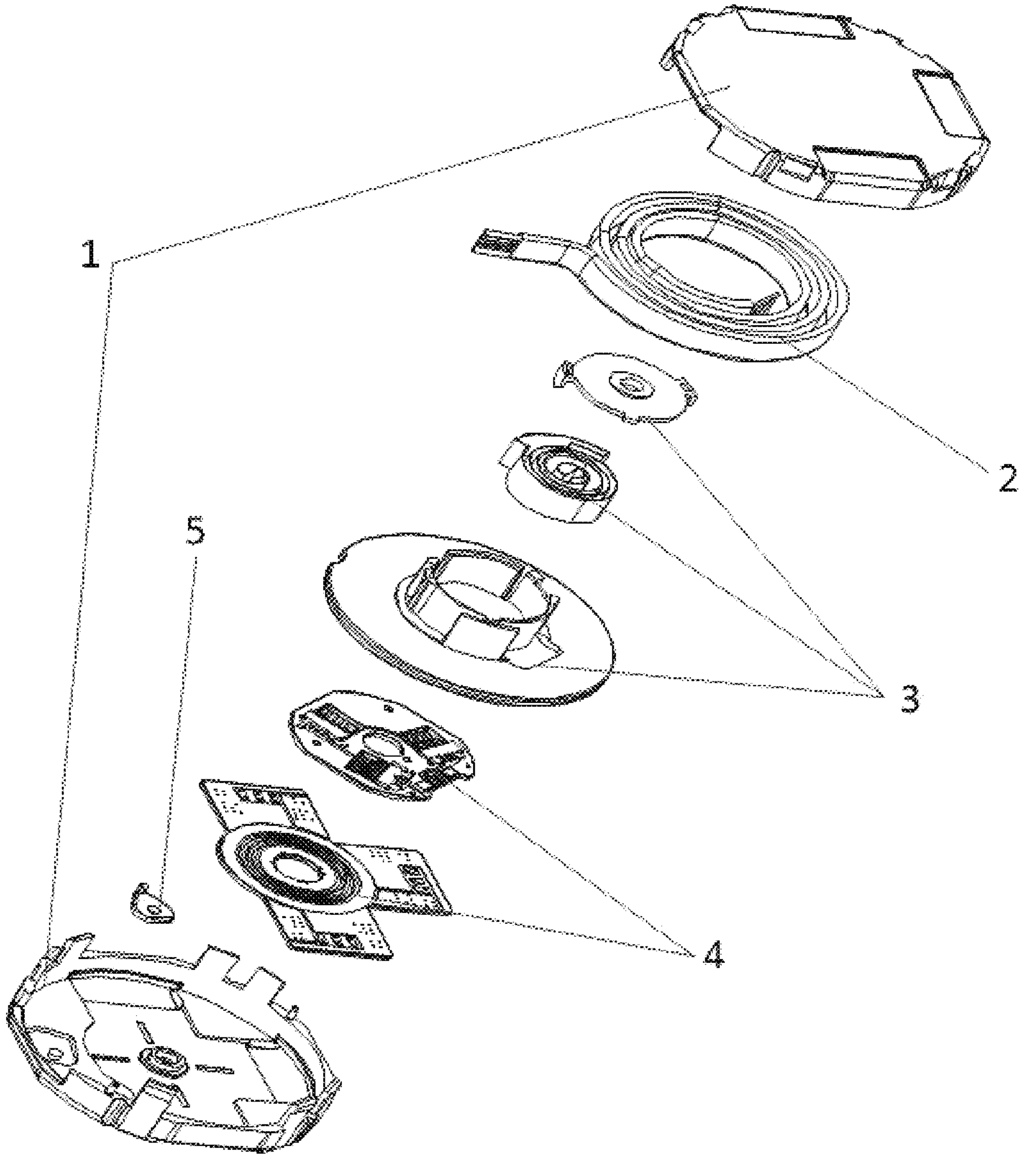
FIG. 1 shows an exploded view of a retractable slip ring transmission mechanism in accordance with some embodiments of the present disclosure.
Figure 2:
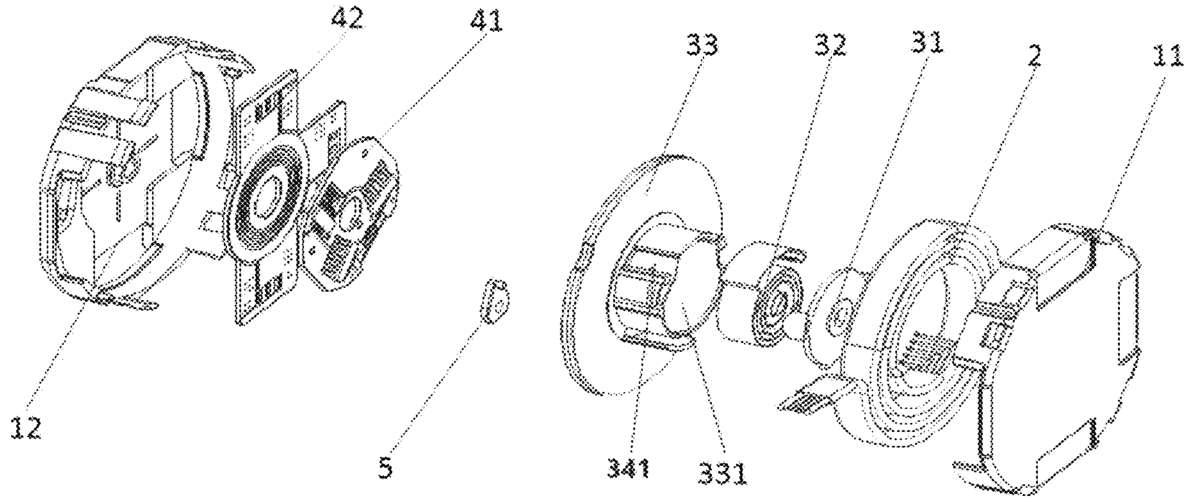
FIG. 2 shows a transverse exploded view of the retractable slip ring transmission mechanism in accordance with some embodiments of the present disclosure.
Figure 3:
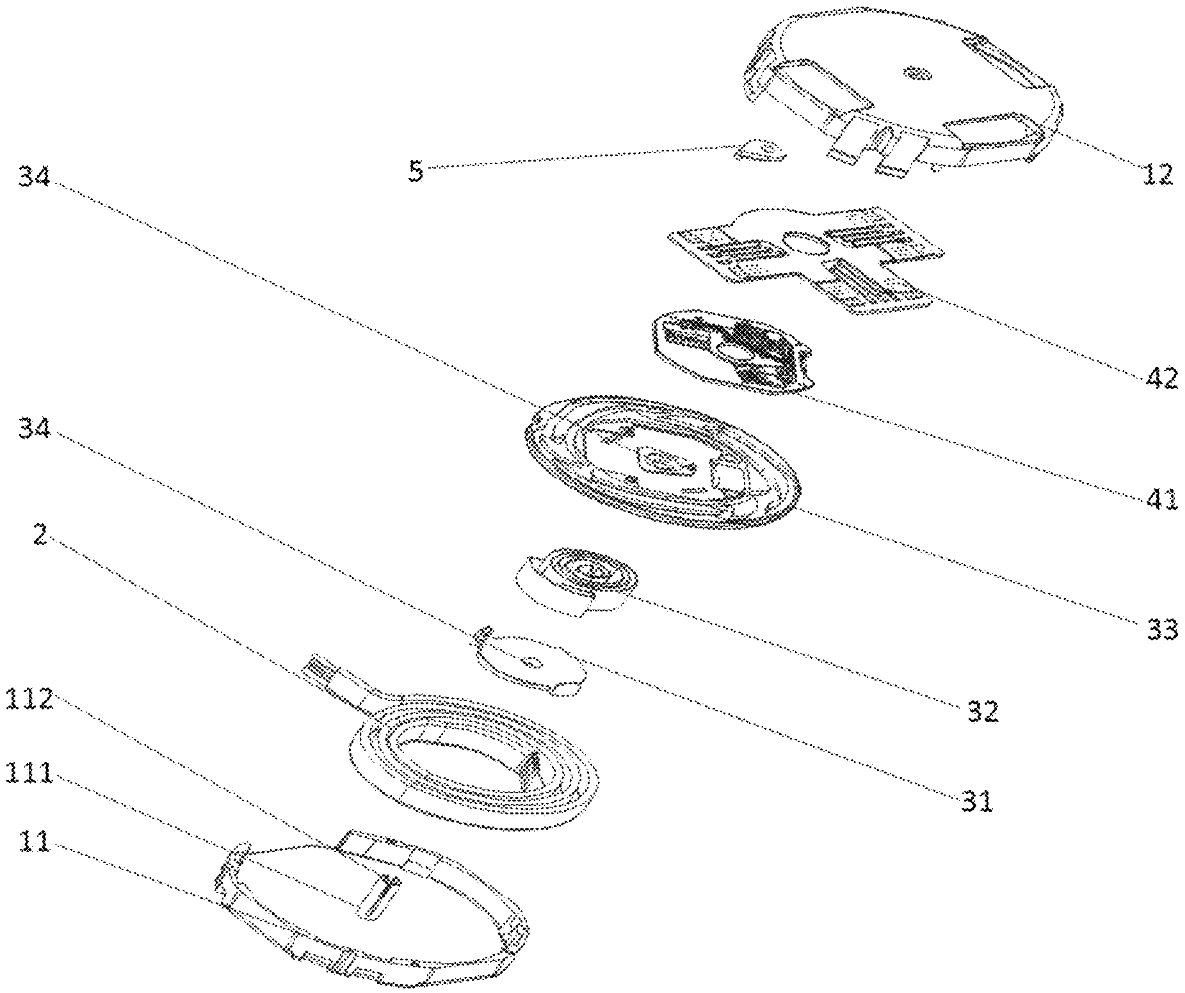
FIG. 3 shows a vertical exploded view of the retractable slip ring transmission mechanism in accordance with some embodiments of the present disclosure.
Figure 4:
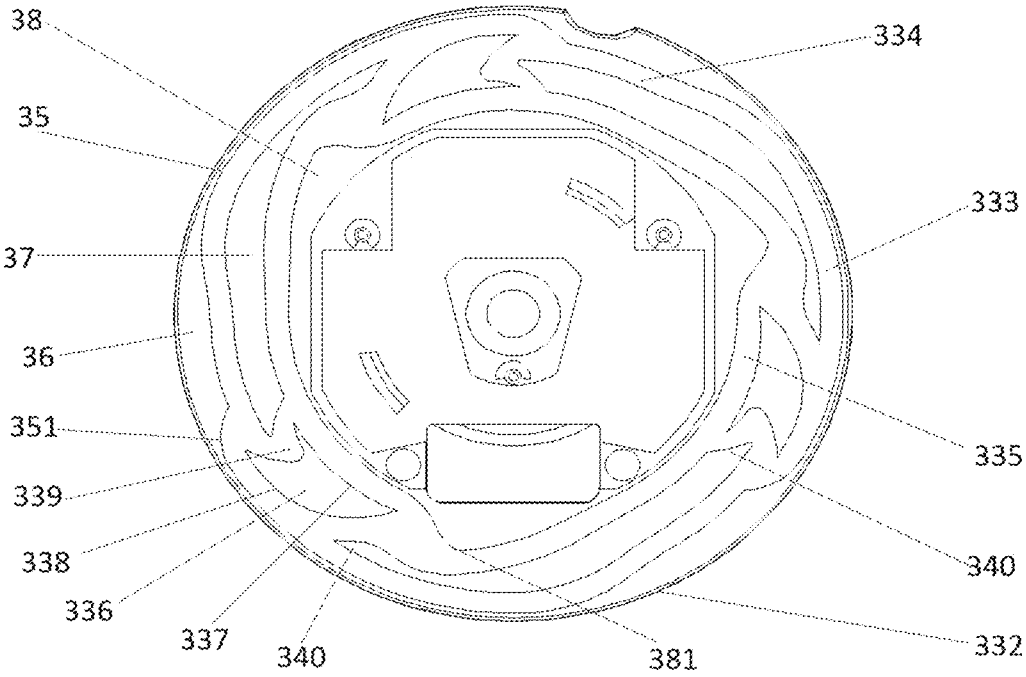
FIG. 4 shows a structural schematic diagram of a self-locking locating track of the retractable slip ring transmission mechanism in accordance with some embodiments of the present disclosure.
Figure 5:
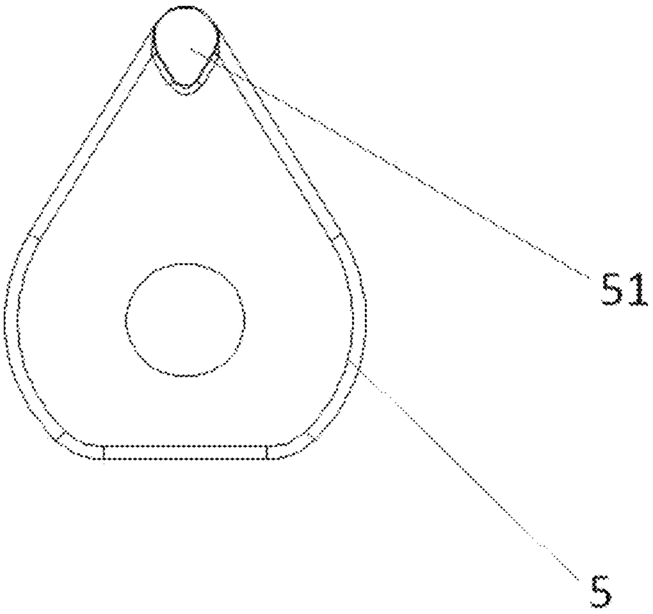
FIG. 5 shows a structural schematic diagram of a self-locking locator of the retractable slip ring transmission mechanism in accordance with some embodiments of the present disclosure.
Figure 6:
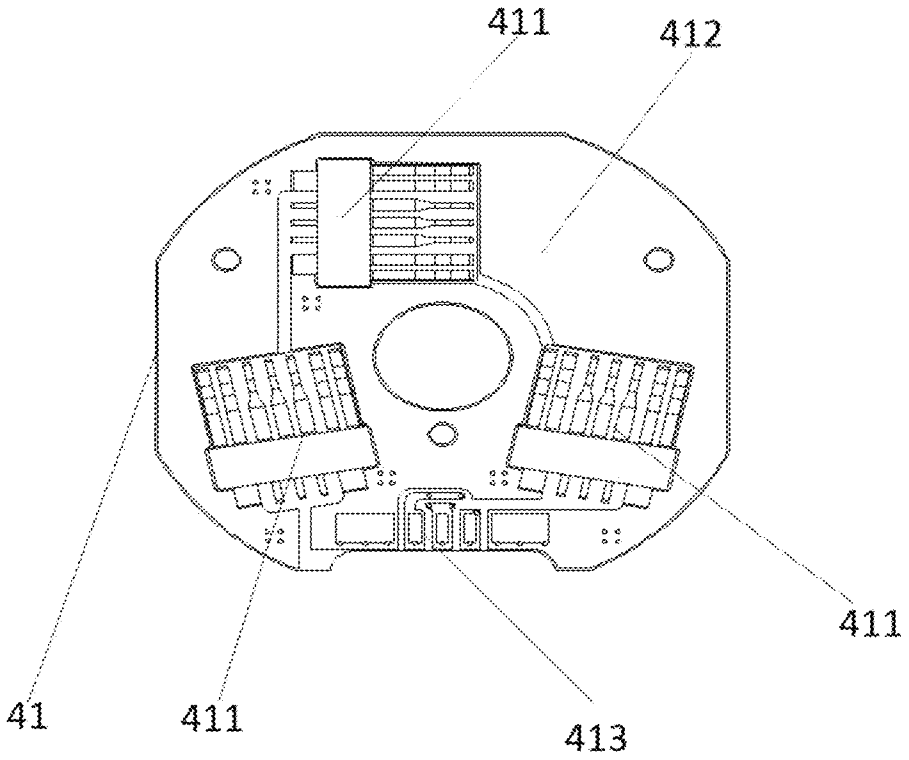
FIG. 6 shows a structural schematic diagram of a movable plate of the retractable slip ring transmission mechanism in accordance with some embodiments of the present disclosure.
Figure 7:
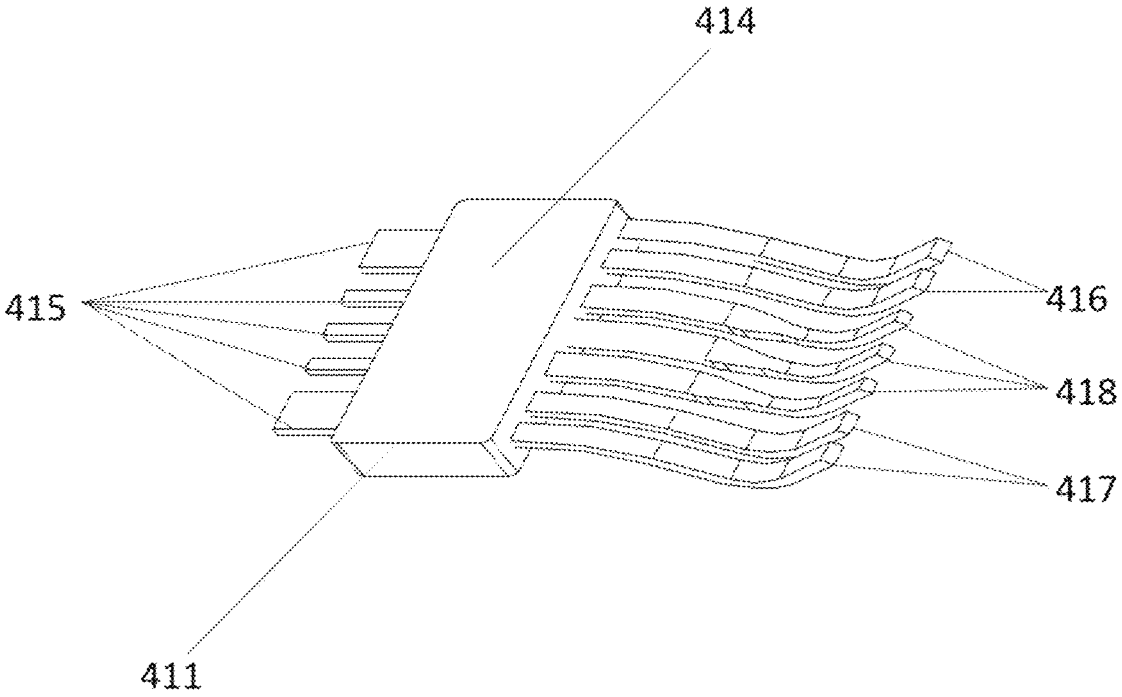
FIG. 7 shows a structural schematic diagram of a connector of the retractable slip ring transmission mechanism in accordance with some embodiments of the present disclosure.
Figure 8:
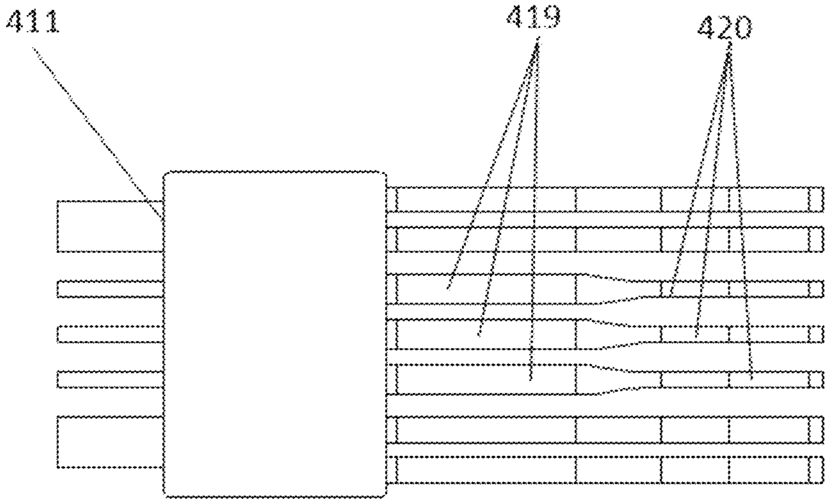
FIG. 8 shows a structural schematic diagram of a signal transmission contact of the retractable slip ring transmission mechanism in accordance with some embodiments of the present disclosure.
Figure 9:
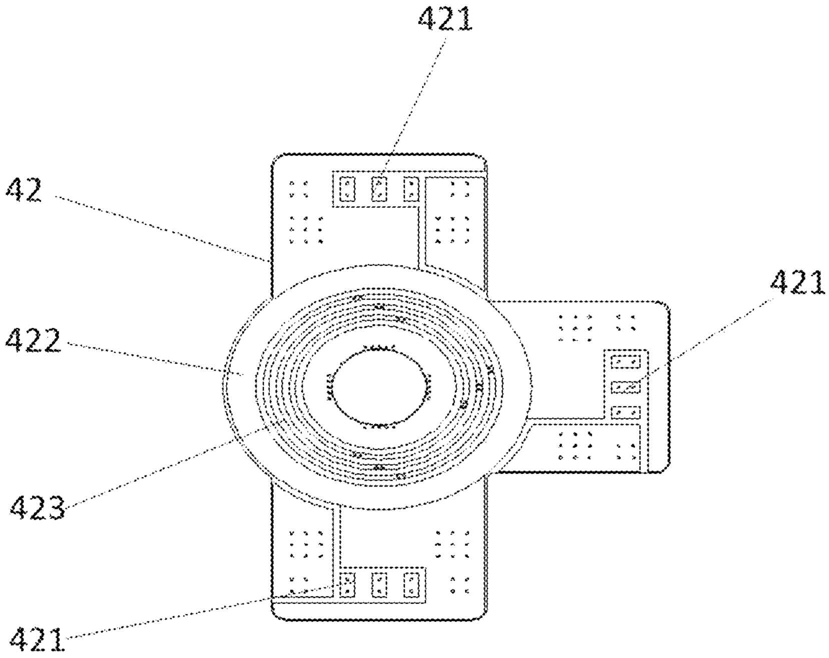
FIG. 9 shows a structural schematic diagram of a fixed plate of the retractable slip ring transmission mechanism in accordance with some embodiments of the present disclosure.

The following will describe clearly and completely the technical solutions in the embodiments of the present disclosure in conjunction with the accompanying FIGS. 1-9. It is obvious that the described embodiments are only a part of the embodiments of the present disclosure and not all of the embodiments. Based on the embodiments in the present disclosure, all other embodiments obtained by the person of ordinary skill in the art without creative labor are within the scope of protection of the present invention.

Embodiment 1

In this embodiment, the retractable slip ring transmission mechanism includes a housing 1, a connecting wire 2, a telescopic component 3, and a transmitting component 4. Herein the connecting wire 2 is wrapped around the telescopic component 3, and the telescopic component 3 is rotatably provided in the housing 1 and connected to the transmitting component 4, and then drive the rotation of the transmitting component 4 by rotating the telescopic component 3. More specifically, the telescopic component 3 includes a first fixed part 31, an elastic part 32 and a second fixed part 33. The second fixed part 33 is provided with a holding compartment 331 on one side for placing the elastic part 32, the elastic part 32 is a coil spring made of an elastic material, an opening 341 is provided in the holding compartment 331 for mounting the elastic part 32. One end of the elastic part 32 is provided on an outer side of the holding compartment 331 to connect to the outer side of the holding compartment 331 together.

In some other embodiments, it is also possible to provide a second mounting port, the one end of the elastic part 32 is snapped to the second mounting port, and the other end of the elastic part 32 is coiled through the opening 341 within the holding compartment 331.

After installation of the elastic part 32 in the holding compartment 331, rotation of the second fixed part 33 enables rewinding of the elastic part 32, then the first fixed part 31 is connected to the holding compartment 331, thereby securing the elastic part 32 in the holding compartment 331 and preventing the elastic part 32 from popping out during winding or releasing. The connecting wire 2 is wrapped around the holding compartment 331, and the connecting wire 2 is a transmission wire used for charging mobile smart devices. One end of the connecting wire 2 is connected to the transmitting component 4, and the other end of the connecting wire 2 is used to connect with the mobile smart devices, such as cell phones, tablets, laptops, etc., which need to be charged. By pulling the connecting wire 2, it is possible to rotate the holding compartment 331, thereby rewinding the elastic part 32. When the connecting wire 2 extends to a desired length, it is automatically locked for charging the mobile smart devices. And when the charging is finished, the connecting wire 2 is unlocked, and the elastic part 32 starts to release, thereby driving the holding compartment 331 to rotate, and the connecting wire 2 wrapped around the holding compartment 331 starts to wind up on the holding compartment 331.

Embodiment 2

On the basis of the Embodiment 1, the Embodiment 2 further includes the following construction. The housing 1 includes a front housing 11 and a rear housing 12, the front housing 11 is provided with an axle centre 111, and the telescopic component 3 is rotatably disposed within the housing 1. More specifically, the axle centre 111 is provided with a slot 112 for snapping to the elastic part 32, the first fixed part 31 and the second fixed part 33 are provided with mounting holes 34 corresponding to the axle center 111. The mounting holes 34 on the first fixed part 31 and the second fixed part 33 are socketed on the axle centre 111, the first fixed part 31 is connected together with the holding compartment 331 of the second fixed part 33, so as to make the elastic part 32 more stable during rotation of the elastic part 32. The elastic part 32 is provided with a card corresponding to the slot 112, and the card can be stuck in the slot 112 of the axle centre 111. When pulling the connecting wire 2 to drive the holding compartment 331 to rotate, the card of the elastic part 32 snaps to the slot 112 of the axle centre 111, causing the elastic part 32 to begin to wind around the axle centre 111. An elastic force will be generated during rewinding, after the connecting wire 2 is stretched to a desired length and then locked, the mobile smart devices will be charged when it is needed for use by pulling the connecting wire 2. When the charging is finished, and the connecting wire 2 is unlocked and will automatically begin to be rewound.

Embodiment 3

On the basis of the Embodiment 2, the Embodiment 3 further includes the following construction. The retractable slip ring transmission mechanism further includes a self-locking locator 5, and the self-locking locator 5 is disposed on the rear housing 12. The other side of the second fixed part 33 is provided with a self-locking locating track 332, by means of the self-locking locator 5 can locate the rotation of the second fixed part 33. Specifically, according to a rotation angle of the second fixed part 33, the self-locking locator 5 is snapped to the self-locking locating track 332, thereby utilizing the self-locking locator 5 to locate the rotation of the second fixed part 33, limiting a telescoping length of the connecting wire 2.

Embodiment 4

On the basis of the Embodiment 3, the Embodiment 4 further includes the following construction. More specifically, the self-locking locating track 332 includes a number of outer rings 333, a number of middle rings 334, an inner ring 335 and a number of locating blocks 336. The outer rings 333, the middle rings 334 and the locating blocks 336 are the same in number.

When pulling the connecting wire 2, the telescopic component 3 rotates to drive the self-locking locating track 332 to rotate, at this time the self-locking locator 5 slides from the inner ring 335 of the self-locking locating track 332 to the outer rings 333 of the self-locking locating track 332, and slides through the first gliding arcs 351 to the middle rings 334, and keeps sliding between the outer rings 333 and the middle rings 334, thereby stretching the connecting wire 2. After stopping pulling the connecting wire 2, the connecting wire 2 starts to contract back under the action of the telescopic component 3, which in turn drives the self-locking track 332 to rotate in an opposite direction, as this time the self-locking locator 5 will retreat from the middle rings 334 or the outer rings 333 and snap to the locating blocks 336, causing the self-locking locating track 332 to stop rotating. When the self-locating locator 5 is snap-fitted to the locating blocks 336, the length of the connecting wire 2 will no longer change, with the greater the number of the locating blocks 336, the shorter the length of the connecting wire 2 starts to telescope under the action of the elastic part 32 while performing the locating, the more precise the locating, preferably the number of the locating blocks 336 is 3. When charging is completed and the connecting wire 2 needs to be rewound, slightly pulling the connecting wire 2 again, the self-locking locator 5 slides from the locating blocks 336 of the self-locking locating track 332 to the inner ring 335, and under the action of the telescopic component 3, the connecting wire 2 begins to rapidly telescope in the inner ring 335, thereby utilizing the cooperation of the outer rings 333, the middle rings 334, the inner ring 335 and the locating blocks 336 to locate the rotation of the self-locking locating track 332, making the expansion and contraction of the connecting wire 2 smoother.

Embodiment 5

On the basis of the Embodiment 4, the Embodiment 5 further includes the following construction. More specifically, the other side of the second fixed part 33 is provided with side tracks 35 matching the number of the outer rings 333, middle tracks 36 matching the number of the middle rings 334, sliding tracks 37 matching the number of the locating blocks 336 and an inner track 38. The outer rings 333 are provided between the side tracks 35 and the sliding tracks 37, the middle rings 334 are provided between the middle tracks 35 and the sliding tracks 37, and the inner ring 335 is provided between the sliding tracks 37 and the inner track 38. The locating blocks 336 are provided in the middle of the side tracks 35 and the inner track 38 vertically, but not necessarily right in the middle. At the same time, the locating blocks 336 are provided in the middle of adjacent sliding tracks 37 horizontally, but not necessarily right in the middle. The first gliding arcs 351 are circular arcs between the side tracks 35 and the middle tracks 36, the outer rings 333 are connected to the middle rings 334 through the first gliding arcs 351, and the inner track 38 is provided with second gliding arcs 381 matching the number of the first gliding arcs 351. The second gliding arcs 381 are arc protrusions on the inner track 38, the first gliding arcs 351 and the second gliding arcs 381 are provided at each end of the locating blocks 336. And meanwhile, the locating blocks 336 are provided with third gliding arcs 337 and the fourth gliding arcs 338, the third gliding arcs 337 and the fourth gliding arcs 338 are in the shape of circular arcs, and the two circular arcs intersect to form a locating bayonet 339, which is used to snap with the self-locking locator 5 and the locating pin 51. The middle tracks 36 are provided with bevels on both sides, where one side forms a telescoping channel with the locating bayonet 339 and the other side forms a stretching channel with the third gliding arcs 337.

When pulling the connecting wire 2, the telescopic component 3 rotates, and further driving the self-locking locating track 332 to rotate. At this time the self-locking locator 5 slides in the inner ring 335 through the second gliding arcs 381*m* and slides along the stretching channel to the outer rings 333, slides in the outer rings 333, and then enters the middle rings 334 after passing through the first gliding arcs 351, and thereafter slides along the middle rings 334 and the outer rings 333 continuously sliding. After stopping pulling the connecting wire 2, the connecting wire 2 starts to contract back under the action of the telescopic component 3, which in turn drives the self-locking locating track 332 to rotate. At this time the self-locking locator 5 will slide from the outer rings 333 or the middle rings 334 to the locating bayonet 339 of the locating blocks 336, causing the self-locking locating track 332 to stop rotating. The connecting wire 2 does not change in length, with the greater the number of the locating blocks 336, the shorter the length of the connecting wire 2 starts to stretch and contraction under the action of the elastic part 32 during locating, the more accurate the locating, the number of the locating blocks 336 is preferably 3. When charging is completed and the connecting wire 2 needs to be retracted, after slightly pulling the connecting wire 2 again, the self-locking locator 5 slides from the telescopic channel at the locating bayonet 339 of the self-locking locating track 332 to the inner ring 335. Under the action of the telescopic component 3, the connecting wire 2 starts to expand and contract rapidly in the inner ring 335, with the cooperation of the side tracks 35, the middle tracks 36, the sliding tracks 37 and the inner track 38, making the expansion and contraction as well as the positioning of the connecting wire 2 more efficient and effective in reducing the failure rate of the equipment.

Embodiment 6

On the basis of the Embodiment 5, the Embodiment 6 further includes the following construction. More specifically, the self-locking locator 5 is provided with a locating pin 51 being an inverted triangular piece enclosed by a rounded edge, the locating pin 51 is slidably provided within the self-locking locating track 332 and used to snap to the locating bayonet 339. The locating pin 51 is designed with the inverted triangular piece enclosed by the rounded edge, which can avoid jamming when sliding on the outer rings 333, the middle rings 334, the inner ring 335, and the locating blocks 336.

Embodiment 7

On the basis of the Embodiment 6, the Embodiment 7 further includes the following construction. More specifically, the transmitting component 4 includes a movable plate 41 and a fixed plate 42. The movable plate 41 is connected to the second fixed part 33, and the movable plate 41 is capable of rotating with the rotation of the second fixed part 33 with the second fixed part 33. The fixed plate 42 is connected to the rear housing 12, the movable plate 41 is connected to the fixed plate 42 together, and with the rotation of the movable plate 41, the connection between the movable plate 41 and the fixed plate 42 is always stabilized.

Embodiment 8

On the basis of the Embodiment 7, the Embodiment 8 further includes the following construction. More specifically, the movable plate 41 includes a number of connectors 411, a connecting plate 412 and a welding disk 413. Preferably, the connectors are in the number of three, set approximately triangularly on the connecting plate 411, and the connectors 411 are connected in parallel with each other. Each of the connectors 411 can rotate against the fixed plate 42, and in this case the connectors can also contact the fixed plate 42 more stably under a high-speed rotation, thus making the work of the transmitting component 4 working more stably. The welding disk 413 is connected in series with the connectors 411, one end of the connecting wire 2 is connected to the welding disk 413 and the other end of the connecting wire 2 is connected to the smart mobile devices that need to be charged, thereby realizing a connection between the connecting wire 2 and the transmitting component 4 in a rotating state under the action of the connectors 411, the connecting plate 412 and the welding disk 413, and realizing the function of the connecting wire being scalable.

Embodiment 9

On the basis of the Embodiment 8, the Embodiment 9 further includes the following construction. More specifically, the connectors 411 include an insulating material 414, and a number of conductive contacts 415. The conductive contacts 415 are connected to the insulating material 414, by means of the insulating material 414 is used to fix the position of the conductive contacts 415 and to prevent short circuits between the conductive contacts 415. The conductive contacts 415 are rotatable against the fixed plate 42, and the contact between the connectors 411 and the fixed plate 42 is achieved under the action of the conductive contacts 415. More specifically, the conductive contacts 415 include at least one positive contact 416, at least one negative contact 417 and at least one signal transmission contact 418. Preferably, the conductive contacts 415 are seven in number, two of which are positive contacts 416, two of which are negative contacts 417, and three of which are signal transmission contacts 418 for transmitting fast charging signals. The positive contacts 416 of the conductive contacts 415 are connected in parallel with each other, the negative contacts 417 of the conductive contacts 415 are connected in parallel with each other, the signal transmission contacts 418 of the conductive contacts 415 are connected in parallel with each other. Even though damage to any one of the positive contacts 416, the negative contacts 417 or the signal transmission contacts 418 does not affect the normal operation of the connectors 411, thereby increasing the reliability of the device.

Embodiment 10

On the basis of the Embodiment 9, the Embodiment 10 further includes the following construction. More specifically, the positive contacts 416, the negative contacts 417 and the signal transmission contacts 418 are made of metal sheets, preferably copper. The signal transmission contact 418 includes a first portion 419 and a second portion 420, the first portion 419 is wider than the second portion 420, the first portion 419 ensures the strength of the signal transmission contact 418, and the second portion 420 is used to connect with the fixed plate 42. The second portion 420 is smaller in width than the second portion 419, with more pressure when in contact with the fixed plate 42, the contact is more tightly and the signal transmission is more stable. More specifically, the fixed plate 42 is provided with inputs 421 for connection with an external power supply and a conductive plate 422 for connection with the connectors 411. The connectors 411 are connected in parallel with each other, and the damage of any one of the connectors 411 does not affect the normal operation. When in use, the inputs 421 is connected to the external power supply and current enters from the inputs 421 onto the conductive plate 422 of the fixed plate 42, the conductive plate 42 is provided with a number of looped conductive tracks 423. The conductive contacts 415 is rotatable against the looped conductive tracks 423, which in turn transmit the current to the conductive contacts 415, and then transmit the current to the welding disk 413 which is connected in series with the connectors 411. The connecting wire 2 is connected to the welding disk 413 at one end so as to complete the whole process of transferring the current, and through the design of the movable plate 41 and the fixed plate 42, it is able to stably transfer the current of the external power supply in the case of high-speed rotation of the movable plate 41 to the connecting wire 2 for charging the mobile smart devices.

Although embodiments of the present disclosure have been shown and described, it will be appreciated by one of ordinary skill in the art that a variety of changes, modifications, substitutions, and variations may be made to these embodiments without departing from the principle and concept of the present invention, the scope of which is limited by the appended claims and their equivalents.

What is claimed is:

1. A retractable slip ring transmission mechanism, comprising:

a housing, a connecting wire, a telescopic component, and a transmitting component;

wherein the housing comprises a front housing and a rear housing, the front housing is connected to the rear housing, and the front housing is provided with an axle centre;

wherein a self-locking locator is provided on the rear housing;

wherein the telescopic component comprises a first fixed part, an elastic part and a second fixed part; the first fixed part and the second fixed part are provided with mounting holes corresponding to the axle centre, the second fixed part is provided with a holding compartment on one side for placing the elastic part, the first fixed part and the second fixed part are pivotably socketed on the axle centre through the mounting holes, and the first fixed part is connected to the holding compartment;

wherein the holding compartment is provided with an opening one end of the elastic part is provided on outside of the holding compartment and the other end of the elastic part is coiled in the holding compartment through the opening, and the one end of the elastic part is connected to the second fixed part;

wherein the axle centre is provided with a slot for snapping to the elastic part, the elastic part is provided with a card corresponding to the slot, and the slot on the axle centre is snapped to the card of the elastic part;

wherein the connecting wire is wrapped around the telescopic component, and the telescopic component is rotatably provided in the housing;

wherein the second fixed part is provided with a self-locking locating track at another side, and the self-locking locator is configured for positioning the self-locking locating track to rotation;

wherein the self-locking locating track comprises outer rings, middle rings, an inner ring, and locating blocks, and the outer rings are connected to the middle rings;

wherein when pulling the connecting wire, the self-locking locating track rotates, and the self-locking locator slides from the inner ring of the self-locking locating track to the outer rings and slides between the outer rings and the middle rings;

wherein when the pulling of the connecting wire is stopped, under an action of the elastic part, the self-locking locating track rotates in an opposite direction and the self-locking locator is seated within the locating blocks of the self-locking locating track; and when the connecting wire is slightly pulled again, the self-locking locator slides from the locating blocks of the self-locking locating track to the inner ring and slides in the inner ring;

wherein another side of the second fixed part is further provided with side tracks corresponding to the outer rings, middle tracks corresponding to the middle rings, sliding tracks corresponding to the locating blocks, and an inner track;

wherein the side tracks are connected to the middle tracks, the outer rings are disposed between the side tracks and the sliding tracks, the middle rings are disposed between the middle tracks and the sliding tracks, the inner ring is disposed between the sliding tracks and the inner track, the locating blocks are disposed between the side tracks and the inner track and also arranged between the sliding tracks;

wherein the side tracks are provided with first gliding arcs corresponding to the locating blocks, the side tracks are connected with the middle tracks through the first sliding arcs, the inner track is provided with second gliding arcs corresponding to the first gliding arcs, and the first gliding arcs and the second gliding arcs are disposed at each end of the locating blocks;

wherein each of the locating blocks is provided with a third gliding arc and a fourth gliding arc, and a locating bayonet is provided between the third gliding arc and the fourth gliding arc, and the locating bayonet is an arc with upper and lower crossing that are configured to snap with the self-locking locator; and wherein the sliding tracks are provided with bevels on both sides, one side of the sliding tracks corresponds to the locating bayonet, and another side of the sliding tracks corresponds to the third gliding arc.

2. The retractable slip ring transmission mechanism according to claim 1, wherein the self-locking locator is provided with a locating pin being an inverted triangle enclosed by a rounded edge, and the locating pin is slidably provided in the self-locking locating track to snap-fit with the locating bayonet.

3. The retractable slip ring transmission mechanism according to claim 1, wherein the transmitting component comprises a movable plate and a fixed plate, the movable plate is connected to the second fixed part, the fixed plate is connected to the rear housing, and the movable plate is rotatable abutted with the fixed plate.

4. The retractable slip ring transmission mechanism according to claim 3, wherein the movable plate comprises a plurality of connectors, a connecting plate and a welding disk;

each of the connectors is distributed in parallel with each other on the connecting plate, and each of the connectors is rotatable abutted with the fixed plate; and wherein the welding disk is connected in series with the connectors, and one end of the connecting wire is connected to the welding disk.

5. The retractable slip ring transmission mechanism according to claim 4, wherein the connectors comprise an insulating material and a plurality of conductive contacts, the insulating material is connected to the connecting plate, the conductive contacts are connected to the insulating material and rotatable abutted with the fixed plate; and wherein the conductive contacts comprise at least one positive contact, at least one negative contact, and at least one signal transmission contact; all positive contacts of the conductive contacts are connected in parallel with each other, all negative contacts of the conductive contacts are connected in parallel with each other, and all signal transmission contacts of the conductive contacts are connected in parallel with each other.

6. The retractable slip ring transmission mechanism according to claim 5, wherein the positive contact, the negative contact and the signal transmission contact are made of metal sheets, the signal transmission contact comprises a first portion and a second portion, and the first portion has a width wider than that of the second portion; and wherein the fixed plate is provided with a plurality of inputs for connection to an external power supply and a conductive plate for connection to the connectors, the conductive plate is provided with a plurality of looped conductive tracks, and the positive contact, the negative contact and the signal transmission contact are rotatable contacted with the looped conductive tracks.

* * * * *